(12) United States Patent
Venable et al.

(10) Patent No.: US 10,469,482 B2
(45) Date of Patent: Nov. 5, 2019

(54) ENCRYPTED DATA RETRIEVAL SYSTEMS AND METHODS TO PROVIDE ACCESS TO ENCRYPTED DATA

(71) Applicant: Masergy Communications, Inc., Plano, TX (US)

(72) Inventors: David Venable, Plano, TX (US); Jake Warren, Plano, TX (US); Chris Dudek, Plano, TX (US)

(73) Assignee: MASERGY COMMUNICATIONS, INC., Plano, TX (US)

( * ) Notice: Subject to any disclaimer, the term of this patent is extended or adjusted under 35 U.S.C. 154(b) by 239 days.

(21) Appl. No.: 15/695,823

(22) Filed: Sep. 5, 2017

(65) Prior Publication Data

US 2019/0075095 A1 Mar. 7, 2019

(51) Int. Cl.
*H04L 29/06* (2006.01)

(52) U.S. Cl.
CPC ........ *H04L 63/083* (2013.01); *H04L 63/0428* (2013.01); *H04L 63/1433* (2013.01); *H04L 63/0861* (2013.01)

(58) Field of Classification Search
CPC .............. H04L 63/083; H04L 63/1433; H04L 63/0428; H04L 63/0861
See application file for complete search history.

(56) References Cited

U.S. PATENT DOCUMENTS

| | | | |
|---|---|---|---|
| 8,856,894 B1 * | 10/2014 | Dean ...................... | H04L 63/08 713/175 |
| 9,282,120 B2 * | 3/2016 | Islam .................. | H04L 63/0876 |
| 9,436,820 B1 * | 9/2016 | Gleichauf ............... | G06F 21/50 |
| 9,654,477 B1 * | 5/2017 | Kotamraju ............ | H04L 63/102 |
| 2015/0059003 A1 * | 2/2015 | Bouse ................. | G06F 16/2228 726/28 |
| 2015/0237074 A1 * | 8/2015 | Mardikar ................ | H04L 63/20 726/1 |
| 2018/0095857 A1 * | 4/2018 | Sarir ..................... | G06F 3/0482 |
| 2018/0288063 A1 * | 10/2018 | Koottayi ............... | G06F 21/552 |

* cited by examiner

Primary Examiner — Christopher C Harris
(74) *Attorney, Agent, or Firm* — McGuireWoods LLP

(57) ABSTRACT

The disclosed embodiments include encrypted data retrieval systems and methods to provide access to encrypted data. In one of such embodiments, the method includes receiving a request to access encrypted data. The method also includes analyzing the request to determine a credential of a source electronic device seeking to access the encrypted data. The method further includes determining, based on the credential of the source electronic device, a category of the request. In response to determining the category of the request, the method further includes selecting additional credentials with which to authenticate the request. The method further includes providing an indication of the credentials to at least one operator, wherein the at least one operator is authorized to enter the additional credentials to release the encrypted data. In response to receiving the additional credentials, the method further includes transmitting the encrypted data to the source electronic device.

23 Claims, 9 Drawing Sheets

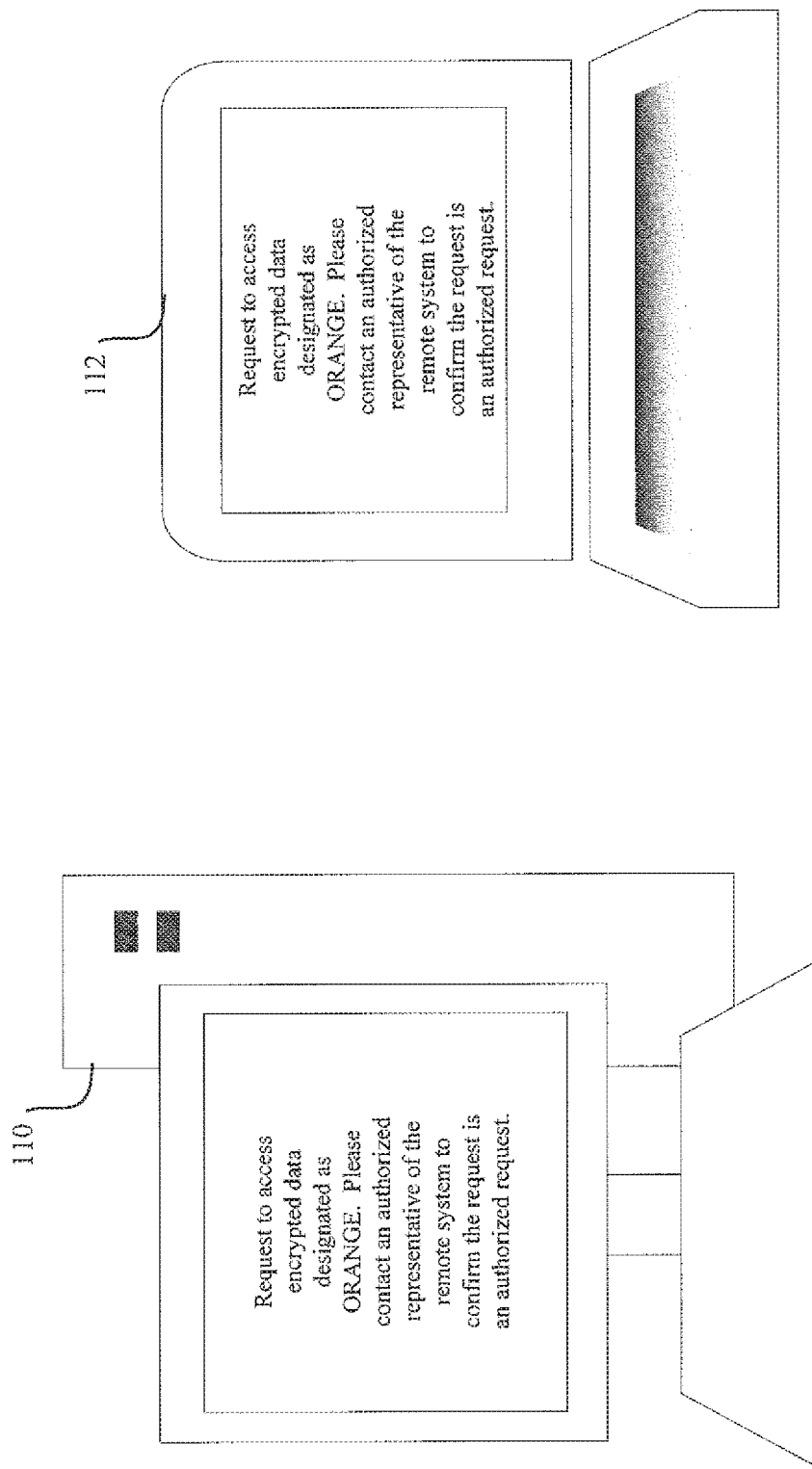

ENCRYPTED DATA RETRIEVAL SYSTEMS AND METHODS TO PROVIDE ACCESS TO ENCRYPTED DATA

BACKGROUND

The present disclosure relates generally to encrypted data retrieval systems and methods to provide access to encrypted data.

As more and more data is stored electronically, security protocols are created to limit access to data to users authorized to access such data. Data is often encrypted using one or more encryption algorithms and keys required to decrypt the encryptions are provided to authorized users. However, providing an authorized user with the keys required to decrypt the encrypted data shifts a part of the burden associated with protecting the encrypted data to the authorized user. The authorized user may lose track of the keys and therefore lose access to the encrypted data. Moreover, the authorized user may store the keys on a system that is vulnerable to cyber-attacks. An unauthorized user seeking to obtain the encrypted data may direct cyber-attacks to the vulnerable system to obtain the keys required to decrypt the encrypted data.

BRIEF SUMMARY OF THE DISCLOSED EMBODIMENTS

The disclosed embodiments provide encrypted data retrieval systems and methods to provide access to encrypted data. In accordance with one embodiment, a computer-implemented method to provide access to encrypted data is provided. The method includes receiving a request to access encrypted data. The method also includes analyzing the request to determine a credential of a source electronic device seeking to access the encrypted data. The method further includes determining, based on the credential of the source electronic device, a category of the request. The method further includes, in response to determining the category of the request, selecting one or more additional credentials with which to authenticate the request. The method further includes providing an indication of the one or more additional credentials to at least one operator, wherein the at least one operator is authorized to enter the one or more additional credentials to release the encrypted data. In response to receiving the one or more additional credentials from the at least one operator, the method further includes transmitting the encrypted data to the source electronic device.

In accordance with another illustrative embodiment, an encrypted data retrieval system is provided. The encrypted data retrieval system includes a storage medium operable to store the encrypted data and a plurality of additional credentials to access the encrypted data. The encrypted data retrieval system also includes a processor operable to analyze, a request from a source electronic device to access encrypted data, to determine a credential of the source electronic device to access the encrypted data. The processor is also operable to determine, based on the credential of the source electronic device, a category of the request. In Response to a determination of the category of the request, the processor is further operable to select one or more additional credentials with which to authenticate the request. The processor is further operable to assign a visual indicator to the one or more additional credentials. The processor is further operable to provide an indication of the one or more credentials to an operator, wherein the indication includes the visual indicator, and wherein the operator is authorized to enter the one or more additional credentials to release the encrypted data. In response to receiving the one or more additional credentials from the operator within an operational duration, the processor is further operable to operate a transceiver to transmit the encrypted data to the source electronic device.

In accordance with a further illustrative embodiment, a non-transitory machine-readable medium is provided. The non-transitory machine-readable medium includes instructions stored therein, which when executed by one or more processors, cause the one or more processors to perform operations including receiving a request to access encrypted data. The instructions also include instructions which cause the one or more processors to perform operations including analyzing the request to determine an internet protocol of the source electronic device and credential of the source electronic device to access the encrypted data. The instructions also include instructions which cause the one or more processors to perform operations including determining, based on the internet protocol and the credential of the source electronic device, a category of the request. The instructions also include instructions which cause the one or more processors to perform operations including in response to determining the category of the request, selecting one or more additional credentials with which to authenticate the request. The instructions also include instructions which cause the one or more processors to perform operations including providing an indication of the one or more additional credentials to an operator, wherein the operator is authorized to enter the one or more additional credentials to release the encrypted data. In response to receiving the one or more additional credentials from the operator within an operational duration, the instructions also include instructions which cause the one or more processors to perform operations including transmitting the encrypted data to the source electronic device. The instructions also include instructions which cause the one or more processors to perform operations including storing data indicative of the request and a response to the request in a storage medium. In response to receiving a subsequent request to access the encrypted data, the instructions also include instructions which cause the one or more processors to perform operations including determining, based on the data indicative of the request and the response to the request, additional credentials to access the encrypted data.

Additional details of the disclosed embodiments are provided below in the detailed description and corresponding drawings.

BRIEF DESCRIPTION OF THE DRAWINGS

Illustrative embodiments of the present invention are described in detail below with reference to the attached drawing Figures, which are incorporated by reference herein, and wherein:

FIG. 4C is another schematic illustration of the display screens of the first and second electronic devices of FIG. 1, where content that identifies the request as a category three request is provided for display on the display screens and in accordance with one embodiment.

Figure 1:
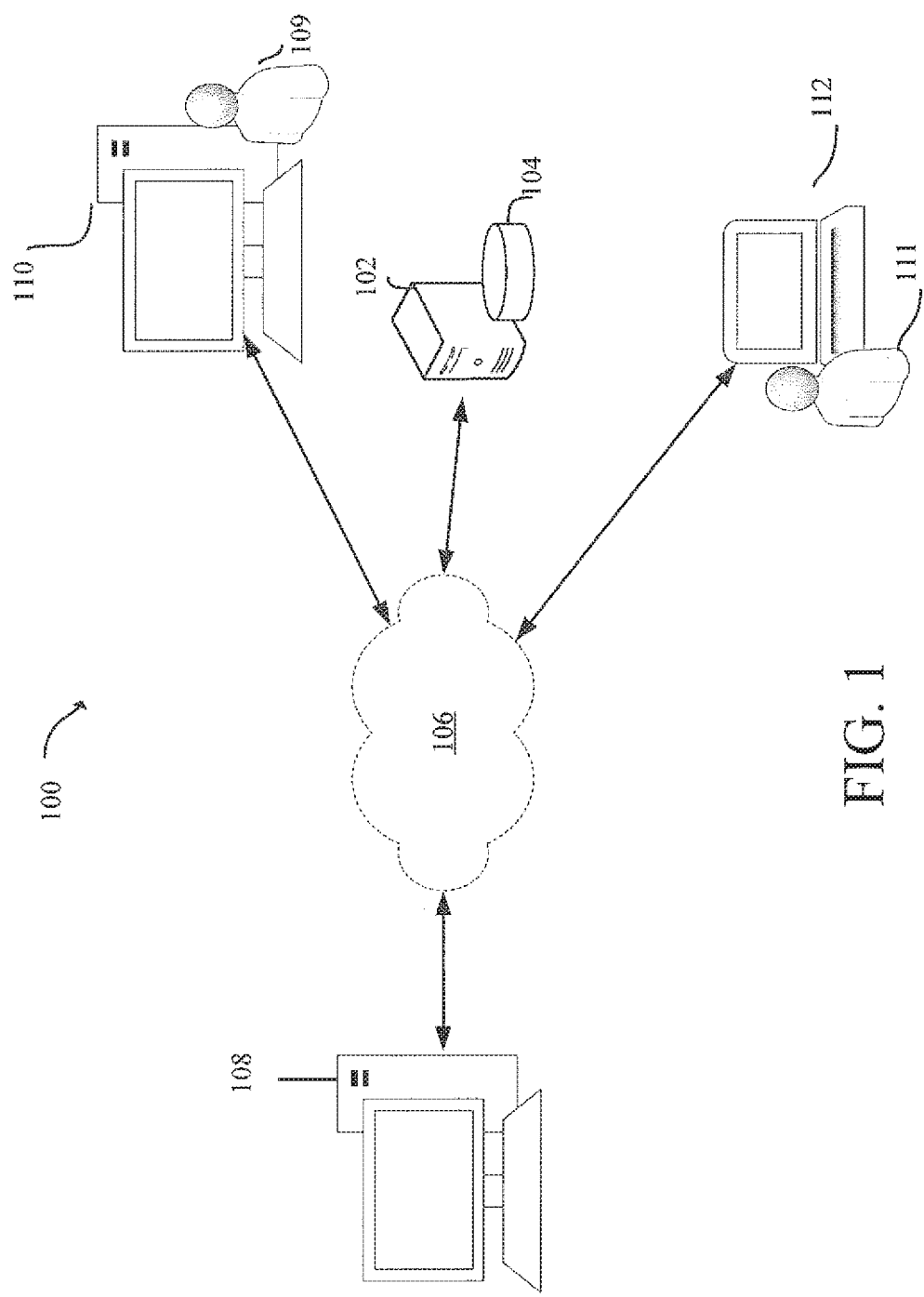
FIG. 1 is a network environment for providing access to encrypted data in accordance with one embodiment.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to process requests from source electronic devices to access encrypted data, determine additional credentials used to grant such requests, and transmit the encrypted data upon receipt of the additional credentials. An encrypted data retrieval system is communicatively connected to one or more source electronic devices and is operable to receive requests from each of the source electronic devices to access encrypted data stored in a storage medium component of the encrypted data retrieval system or stored in a storage device accessible by the encrypted data retrieval system. As defined herein, a source electronic device is any electronic device operable to transmit a request to access encrypted data to the encrypted data retrieval system. The encrypted data retrieval system, upon receipt of a request from a source electronic device to access the encrypted data, analyzes the request to determine the credential of the source electronic device.

As defined herein, the credential of the source electronic device includes any quantifiable metric that is applied by the encrypted data retrieval system to verify the authenticity of the request and to determine what (if any) actions should be performed in order to provide the encrypted data to the source electronic device. In some embodiments, the credential of the source electronic device includes device-based credentials, such as, but not limited to the identification of the source electronic device, a history of the source electronic device's previous requests to access the encrypted data, a perceived risk level of the source electronic device, and the assigned status of the source electronic device. In some embodiments, the credential of the source electronic device also includes user-based credentials of an authorized user of the source electronic device, such as, but not limited to a passcode assigned to the authorized user, a biometric of the authorized user (such as but not limited to a recording of the authorized user's voice, a scan of the authorized user's finger prints, a scan of the authorized user's signature, and scan of the authorized user's facial geometry), a key assigned to authorized user, a history of the authorized user's prior requests to access the encrypted data and a perceived risk level of the authorized user. In further embodiments, the credential of the source electronic device further includes network-based credentials, such as, but not limited to the current internet protocol address of the source electronic device, previous internet protocol addresses of the source electronic device, validated internet protocol addresses of the source electronic device, the communication protocols utilized by the source electronic device, and the number of hops the request traveled to reach the encrypted data retrieval system. In further embodiments, the credential of the source electronic device further includes request-based credentials, such as, but not limited to the time elapsed since the last request from the source electronic device, the time elapsed since the last transmission of the encrypted data, and the amount of time the source electronic device has been offline. Additional examples of metrics applied by the encrypted data retrieval system to determine the credential of the source electronic device are described in the paragraphs below.

In the primary embodiment, the credential of the source electronic device is not sufficient to gain access to the encrypted data. Instead, the encrypted data retrieval system categorizes the request based on the credential of the source electronic device. As defined herein, each category of request is associated with one or more additional credentials, which are used by the encrypted data retrieval system to authenticate the request and to obtain the encrypted data. For example, the request is categorized as a "category one request" if the encrypted data retrieval system has verified the authenticity of the authorized user's key and has determined that the internet protocol address of the source electronic device matches a verified address. The encrypted data retrieval system may alternatively categorize the request differently based on other credentials of the source electronic device. Continuing with the foregoing example, the request is categorized as a "category four request" if the encrypted data retrieval system determines that the source electronic device is a deprecated system. Although the foregoing example and certain examples below imply or describe four different categories of requests, the encrypted data retrieval system is operable to classify the request as one of any other number of categories, where each category of request is associated with one or more additional credentials used by the encrypted data retrieval system to authenticate the request and to obtain the encrypted data.

In some embodiments, the encrypted data retrieval system determines a risk level associated with transmitting the encrypted data to the source electronic device and categorizes the request based on the determined risk level. In some embodiments, the encrypted data retrieval system also utilizes graphical, text, audio, or other types of content to represent the different categories. For example, in addition to providing an operator (which includes any human or machine operable to enter additional credentials used by the encrypted data retrieval system to access the encrypted data) with text-based instructions identifying the applicable category of requests, the encrypted data retrieval system also provides a visual indicator (such as a green colored background) for display on the operator's electronic device if the request is a category one request and provides a different visual indicator (such as a yellow colored background) for display on the operator's electronic device if the request belongs to a different category. In such embodiments, the colored background also facilitates the operator to identify the category of the request. In some embodiments, where the encrypted data retrieval system determines a risk level associated with transmitting the encrypted data, the background color is also indicative of the risk level associated with transmitting the encrypted data. Continuing with the foregoing example, the green colored background is indicative of a low risk level request, whereas the yellow colored background is indicative of a medium risk level request. Additional examples and processes to categorize the requests as well as examples of types of content indicative of the different categories are described in the paragraphs below and are illustrated in at least FIGS. 3 and 4A-4E.

The encrypted data retrieval system, in response to determining the category of the request, determines which additional credentials should be provided to the encrypted data retrieval system to access the encrypted data. As defined herein, the additional credentials are credentials that are not provided by the source electronic device, but are rather provided by one or more operators of the encrypted data retrieval system. The additional credentials include any indication provided by the operators, with which the encrypted data retrieval system utilizes to authenticate the request and to obtain access to the encrypted data. Examples of additional credentials include passcodes assigned to the operators, biometrics of the operators (such as but not limited to a recording of the operator's voice, a scan of the operator's finger prints, a scan of the operator's signature, and a scan of the operator's facial geometry), various acknowledgements from the operator (such as an acknowledgement that the authorized user has verified the authenticity of the request), as well as other quantifiable indications provided by the operator. As stated herein, each category of request is associated with one or more additional credentials utilized by the encrypted data retrieval system to authenticate the request and to obtain the encrypted data. For example, the encrypted data retrieval system, in response to determining that an internet protocol address of the source electronic device matches a verified internet protocol address, designates the request as a category one request and transmits a request to one operator to enter in a passcode to release the encrypted data. In this case, the additional credential is a passcode assigned to the operator. In some embodiments, the additional credentials are indicative of pieces of a key that are utilized by the data encryption retrieval system to decrypt the encrypted data. In one of such embodiments, the additional credentials are two (or more) passcodes assigned to at least two different operators. Each passcode is a piece of a key (or represents data the encrypted data retrieval system combines to form the key). The encrypted data retrieval system, upon obtaining a minimum number of different pieces of keys, is operable to combine the pieces to form the key, and use the key to decrypt the encrypted data.

Continuing with the foregoing example, if the encrypted data retrieval system determines that although the internet protocol address of the source electronic device matches a verified internet protocol address, the source electronic device has been offline for more than a threshold period of time, the request is designated as a category two request. The encrypted data retrieval system then transmits a request to the operator to request the operator to obtain verbal confirmation from an authorized user of the source electronic device that the authorized user authorized such request. In such case, the additional credentials include the verbal verification from the authorized user. Examples of the additional credentials include different passcodes by different operators, nonverbal verifications from the authorized user indicating the authorized user authorized such request, removal of the source electronic device from a list of deprecated systems, where a deprecated system is a system that should not receive the encrypted data (due to being stolen, lost, out-of-date, or any other quantifiable reason specified by the authorized user or by the operator), as well as other quantifiable metrics that correspond to the additional credentials. Additional examples of the additional credentials are provided in the paragraphs below and are illustrated in at least FIGS. 3 and 4A-4E. As such, the additional credentials provide a variable layer of security to ensure the source electronic device is authorized to obtain the encrypted data.

The encrypted data retrieval system, in response to receiving the additional credentials from the operator, confirms the validity of the additional credentials, and transmits the encrypted data to the source upon confirming the validity of the credentials. In some embodiments, the encrypted data represents an encrypted key that the source electronic device utilizes to decrypt another encrypted data, or to perform boot-up, or other operations. In other embodiments, where the source electronic device has access to a key to decrypt the encrypted data, the encrypted data retrieval system securely transmits the encrypted data to the source electronic device. Additional descriptions of the encrypted data retrieval system and operations performed by the encrypted data retrieval system are described in the paragraphs below and are illustrated in FIGS. 1-5.

FIG. 1 is a network environment 100 for accessing encrypted data in accordance with one embodiment. The network environment 100 includes an encrypted data retrieval system 102 that is communicatively connected to a source electronic device 108, a first electronic device 110, and a second electronic device 112, via a network 106. Examples of source electronic devices include laptop computers, tablet computers, smartphones, smart watches, PDAs, server systems, as well as similar electronic devices having hardware and software components operable to initiate a request to access encrypted data. Examples of the encrypted data retrieval system 102 include work management stations, server systems, desktop computers, laptop computers, tablet computers, smartphones, smart watches, PDAs, as well as similar electronic devices having a processor operable to analyze requests from source electronic devices to determine the credential of the source electronic devices, determine additional credentials used to access encrypted data, and access a storage medium, such as storage medium 104, to retrieve the encrypted data.

The storage medium 104 may be formed from data storage components such as, but not limited to, read-only memory (ROM), random access memory (RAM), flash memory, magnetic hard drives, solid state hard drives, CD-ROM drives, DVD drives, floppy disk drives, as well as other types of data storage components and devices. In some embodiments, the storage medium 104 includes multiple data storage devices. In further embodiments, the multiple data storage devices may be physically stored at different locations. In one of such embodiments, the data storage devices are components of a server station, such as a cloud server. In another one of such embodiments, the data storage devices are components of the encrypted data retrieval system 102. The storage medium 104, in addition to storing the encrypted data, also stores data utilized to determine the credential of the source electronic device 108, which additional credentials should be provided to the encrypted data retrieval system 102 to authenticate the request, as well as instructions to perform various operations described herein. Additional descriptions and illustrations of data and instructions utilized by the encrypted data retrieval system 102 are described in additional detail in the paragraphs below and are illustrated in at least FIGS. 2 and 3.

The encrypted data retrieval system 102, upon receipt of a request to access encrypted data, analyzes the request to determine the credential of the source electronic device 108. In some embodiments, the encrypted data retrieval system 102 determines the internet protocol address of the source electronic device 108, where the credential of the source electronic device 108 is based on whether the internet protocol address of the source electronic device 108 matches a verified internet protocol address that is stored in the storage medium 104. In one of such embodiments, a database of previously verified internet protocol addresses is stored in the storage medium 104 and is periodically updated by the encrypted data retrieval system 102. In such embodiments, the encrypted data retrieval system 102, upon determining the internet protocol address of the source electronic device 108, traverses the database to determine whether the internet protocol address matches any of the verified internet protocol addresses that are stored in the database. In other embodiments, the source electronic device 108 is operable to receive an identifier (such as a machine identification number or another indication of the identity of the source electronic device 108) of the source electronic device 108. In such embodiments, the encrypted data retrieval system 102 is further operable to determine the credential of the source electronic device 108 based on the received identifier. In one of such embodiments, a database containing the identifiers of all known source electronic devices is stored in the storage medium 104. In such embodiments, the encrypted data retrieval system 102, upon determining receipt of the identifier of the source electronic device 108, traverses the database to determine whether the received identifier matches any of the identifiers that are stored in the database. In further embodiments, where the encrypted data retrieval system 102 receives a user credential (such as a key) of the authorized user of the source electronic device 108, the encrypted data retrieval system 102 determines the credential of the source electronic device 108 based on whether the user credential matches a verified user credential. Additional examples of the processes performed by the encrypted data retrieval system 102 to determine the credential of the source electronic device 108 is provided in the paragraphs below.

The encrypted data retrieval system 102 then categorizes the request as one of several categories of requests. In some embodiments, the encrypted data retrieval system 102 determines, based on the credential of the source electronic device 108, a risk level associated with providing the encrypted data to the source electronic device 108. In such embodiments, the encrypted data retrieval system 102 categorizes the request based on the determined risk level. For example, the encrypted data retrieval system 102 assigns the request a category one through category four request depending on whether the encrypted data retrieval system 102 determines that the risk level associated with providing the encrypted data to the source electronic device 108 is "low," "medium," "medium-high," or "high," respectively.

The encrypted data retrieval system 102, in response to determining the category of the request, determines which additional credentials should be provided to the encrypted data retrieval system 102 to access the encrypted data. In some embodiments, the encrypted data retrieval system 102 generates additional content associated with each category of request and provides the additional content for display on the first and second electronic devices 110 and 112. In one of such embodiments, the encrypted data retrieval system 102 assigns a different color to each category and provides the assigned color for display as the background color of the first and second electronic devices 110 and 112. For example, a green background color is displayed on one of the first and second electronic devices 110 and 112 if the request is classified as a category one request, a yellow background color is displayed on the first and second electronic devices 110 and 112 if the request is classified as a category two request, an orange background color is displayed on the first and second electronic devices 110 and 112 if the request is classified as a category three request, and a red background color is displayed on the first and second electronic devices 110 and 112 if the request is classified as a category four request. In other embodiments, the encrypted data retrieval system 102 is also operable to transmit other types of text-based, graphical, audio, audio-visual, multi-media, or similar content to the operator's electronic device to facilitate the operator to quickly identify the category of request, as well as which additional credentials should be provided to the encrypted data retrieval system 102 to gain access to the encrypted data. Additional examples of content indicative of the category of the request as well as which additional credentials should be provided to the encrypted data retrieval system 102 to gain access to the encrypted data are described in the paragraphs below and illustrated in FIGS. 4A-4E.

The first and the second operators 109 and 111 of the first and the second electronic devices 110 and 112, respectively, in response to viewing requests for the additional credentials, may enter the additional credentials via the first and the second electronic devices 110 and 112, respectively. As stated herein, the first and second operators 109 and 111 are any human or machine operator operable to provide one or more additional credentials to the encrypted data retrieval system 102. The first and second operators 109 and 111 may operate locally or remotely from the encrypted data retrieval system 102.

The encrypted data retrieval system 102, in response to confirming that the additional credentials have been satisfied, transmits the encrypted data to the source electronic device 108 via the network 106. In some embodiments, the encrypted data corresponds to a key stored in the storage medium 104. In such embodiments, the encrypted data retrieval system 102, in response to receiving the additional credentials, transmits the key to the source electronic device 108. In one of such embodiments, the source electronic device 108 utilizes the received key (or combines the received key with another key) to decrypt other encrypted data the source electronic device 108 has access to, to complete boot-up operations, or to perform other secure operations.

The network 106 can include, for example, any one or more of a cellular network, a satellite network, a personal area network (PAN), a local area network (LAN), a wide area network (WAN), a broadband network (BBN), a RFID network, a Bluetooth network, a device to device network, the Internet, and the like. Further, the network 106 can include, but is not limited to, any one or more of the following network topologies, including a bus network, a star network, a ring network, a mesh network, a star-bus network, a tree or hierarchical network, or similar network architecture. The network 106 may be implemented using different protocols of the internet protocol suite such as TCP/IP. The network 106 includes one or more interfaces for data transfer. In some embodiments, the network 106 includes a wired or wireless networking device (not shown) operable to facilitate one or more types of wired and wireless communication between the encrypted data retrieval system 102, the source electronic device 108, the first electronic device 110, the second electronic device 112, as well as other electronic devices (not shown) communicatively connected to the network 106. Examples of the networking device include, but are not limited to, wired and wireless routers, wired and wireless modems, access points, as well as other types of suitable networking devices described herein. Examples of wired and wireless communication include, Ethernet, WiFi, Cellular, LTE, GPS, Bluetooth, RFID, as well as other types of communication modes described herein.

Although FIG. 1 illustrates one source electronic device 108 and two operator controlled electronic devices 110 and 112 connected to the encrypted data retrieval system 102 via the network 106, additional source electronic devices (not shown) operable to transmit requests to obtain other encrypted data stored in the storage medium 104, and additional operator controlled electronic devices (not shown) operated by other operators (not shown) may also be communicatively connected to the encrypted data retrieval system 102 via the network 106. In some embodiments, the encrypted data retrieval system 102 is operable to simultaneously perform multiple operations described herein to process multiple requests from different source electronic devices, determine which additional credentials should be provided to the encrypted data retrieval system 102 to gain access to different encrypted data, and provide each source electronic device with encrypted data the respective electronic device is authorized to receive. In some embodiments, the first and second electronic devices 110 and 112 are components of the encrypted data retrieval system 102.

Figure 2:
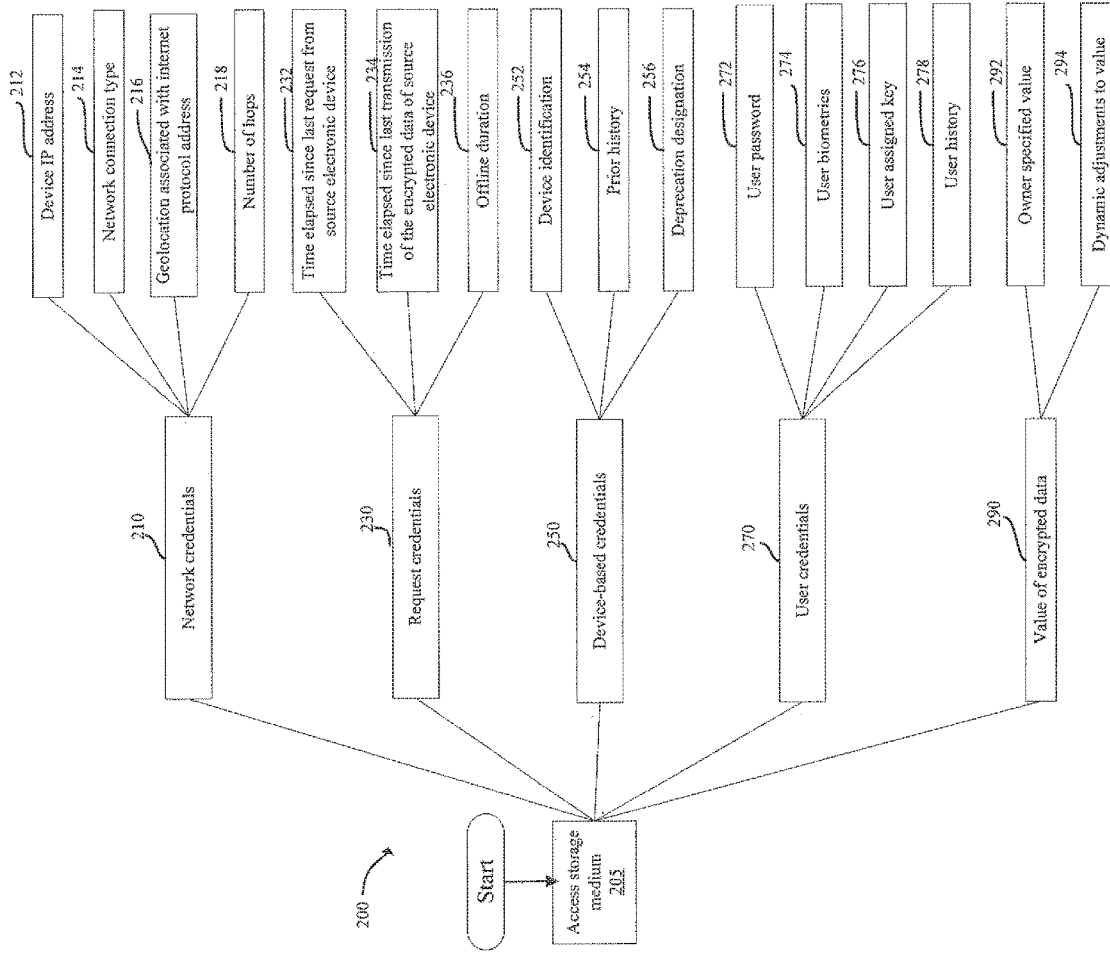
FIG. 2 is a tree diagram illustrating a process to determine a category of the request.

FIG. 2 is a tree diagram illustrating a process 200 to determine a category of a request transmitted by the source electronic device 108. Although operations in the process 200 are shown in a particular sequence, certain operations may be performed in different sequences or at the same time where feasible. Further, in some embodiments, different combinations of some or all of the steps of the process 200 are performed to obtain the business rules to determine the additional credentials.

As stated herein, business rules for categorizing a request are stored in the storage medium 104 and include business rules (or categories of business rules) that define how to categorize the request based on network credentials, request credentials, device-based credentials, user credentials, value of the encrypted data, as well as other quantifiable measurements. At step 205, the encrypted data retrieval system 102, upon determining the credential of the source electronic device 108, accesses the storage medium 104 to obtain business rules to determine how to categorize the request. The business rules define a variety of quantifiable metrics for categorizing the request based on the credential of the source electronic device 108. In some embodiments, the business rules define how to categorize a request based on whether one or more conditions is true or false. In one of such embodiments, the business rules include a business rule that defines categorizing the request as a category four request if the source electronic device has been designated as a deprecated system.

In other embodiments, the business rules define how to categorize the request based on a mathematical function. In one of such embodiments, the business rules include a business rule that assigns values based on the number of minutes the source electronic device has been offline, and determines the category of the request based on the number of minutes the source electronic device has been offline, or based on whether the source electronic device has been offline for more than a threshold period of time. In some embodiments, where the category of the request is indicative of a risk level associated with transmitting the encrypted data to the source electronic device 108, the business rules include business rules that define metrics for calculating the risk level and metrics for determining the category of request based on the calculated risk level. For example, a risk level of 0-20 out of 100 is a category one request, a risk level between 21-40 out of 100 is a category two request, a risk level between 41-60 out of 100 is a category three request, and a risk level of 61-100 is a category four request. One of ordinary skill would understand that the ratios and ranges provided in the examples described herein are only examples, and that categories of requests as well as risk levels may be defined by any quantifiable range or value.

At step 210, the encrypted data retrieval system 102 obtains a first category of the business rules that define how to categorize the request based on the network credentials of the source electronic device 108. This category is further divided into sub-categories to provide more granular groups of business rules that should be applied to categorize the request.

At step 212, the encrypted data retrieval system 102 accesses the device internet protocol address subcategory and applies business rules that define how to categorize the request based on the internet protocol address of the source electronic device 108. In such embodiments, a database containing a list of previously verified internet protocol addresses is stored in the storage medium 104. The encrypted data retrieval system 102, upon determining the internet protocol address of the source electronic device 108, traverses the database to determine whether the internet protocol address of the source electronic device 108 matches any of the verified internet protocol addresses. In one of such embodiments, the business rules define how to determine a risk level based on whether the internet protocol address of the source electronic device 108 matches any of the verified internet protocol addresses. For example, a risk level of 10 out of 100 is assigned to the request if the internet protocol address of the source electronic device matches a verified address but a risk level of 50 out of 100 is assigned to the request if the internet protocol address of the source electronic device does not match any of the verified addresses.

At step 214, the encrypted data retrieval system 102 accesses the network connection type subcategory and applies business rules that define how to categorize the request based on the type of the network connection. In that regard, the encrypted data retrieval system 102 is operable to determine the type of network connection used by the source electrical device 108 to communicatively connect to the encrypted data retrieval system 102. For example, if the network 106 is a network approved by the encrypted data retrieval system 102 to handle encrypted data transfer, then the request is classified as having a low-level of risk. Alternatively, if the network 106 is an unsecured network, then the request is classified as having a high level of risk.

At step 216, the encrypted data retrieval system 102 accesses the geolocation class sub-category to determine how to categorize the request based on a geolocation associated with the internet protocol address. In some embodiments, a database containing a list of locations associated with the source electronic device 108 is stored in the storage medium 104. The encrypted data retrieval system 102, upon determining a geolocation associated with the internet protocol address of the source electronic device 108, traverses the database to determine whether the geolocation matches any of the geolocations associated with the source electronic device 108. In one of such embodiments, the business rules also define categorizing the request based on the zip code, city, state, or country associated with the geolocation of the source electronic device 108. For example, regardless of other factors described herein, the request would be designated as a "category four request" if the request originates from country A.

At step 218, the encrypted data retrieval system 102 accesses the number of hops subcategory and applies business rules that define how to categorize the request based on the number of hops the request takes to reach the encrypted data retrieval system 102. As defined herein, a hop is when data is transmitted to an intermediary device or network, which participates in the data transfer. For example, if the source electronic device 108 is connected to a LAN and transmits the request to the LAN, which in turn transmits the request to the encrypted data retrieval system 102, then the request takes one hop. In some embodiments, the business rules define calculating a value based on the number of hops the request takes and determining the category of the request based on the number of hops the request takes to reach the encrypted data retrieval system 102. For example, the business rules define categorizing the request as a category one request if the request does not take any hop, categorizing the request as a category two request if the request takes one or two hops, categorizing the request as a category three request if the request takes between three and five hops, and categorizing the request as a category four request if the request takes more than five hops to reach the encrypted data retrieval system 102. In other embodiments, the business rules also define how to categorize the request if one or more of hops are facilitated by a pre-authorized intermediary device or network. In further embodiments, the business rules also define how to categorize the request based on the number of hops the encrypted data would take between the encrypted data retrieval system 102 and the source electronic device 108 and whether any of the hops are facilitated by pre-authorized intermediary devices or networks.

At step 230, the encrypted data retrieval system 102 obtains a second category of the business rules that define how to categorize the request based on the requested credentials of the source electronic device 108. At step 232, the encrypted data retrieval system 102 accesses a time elapsed since last request from the source electronic device sub-category to determine business rules that define how to determine the category of the request based on the amount of elapsed time since the last communication between the encrypted data retrieval system 102 and the source electronic device 108. For example, the business rules define categorizing the request as a category one request if the elapsed time since the last communication is less than a first threshold period of time, and categorizing the request as a category two request if the elapsed time since the last communication is greater than or equal to the first threshold period of time. At step 234, the encrypted data retrieval system 102 accesses a time elapsed since the encrypted data retrieval system 102 last transmitted encrypted data to the source electronic device 108 to determine business rules that define how to determine the category of the request based on the amount of elapsed time since the transmission of the encrypted data from the encrypted data retrieval system 102 to the source electronic device 108. In some embodiments, the business rules are similar to the business rules described with respect to step 234. In other embodiments, if the encrypted data retrieval system 102 has never transmitted encrypted data to the source electronic device 108, then the business rules define categorizing the request as a category that is associated with having a high level of risk. At step 236, the encrypted data retrieval system 102 accesses the offline duration sub-category to determine business rules that define how to determine the category of the request based on the amount of time the source electronic device 108 has been offline.

At step 250, the encrypted data retrieval system 102 obtains a third category of the business rules that define how to categorize the request based on the device-based credentials of the source electronic device 108. At step 252, the encrypted data retrieval system 102 accesses a device identification sub-category to determine business rules that define how to determine the category of the request based on the identification of the source electronic device 108. As described herein, the identification of the source electronic device 108, such as a machine identification number of the source electronic device 108, is sometimes transmitted along with the request. In some embodiments, a database containing a list of previously verified machine identification numbers is stored in the storage medium 104. The encrypted data retrieval system 102, upon determining the machine identification number of the source electronic device 108, traverses the database to determine whether the machine identification number of the source electronic device 108 matches any of the verified machine identification numbers. In one of such embodiments, the encrypted data retrieval system 102 categorizes the request as a category one request if the machine identification number of the source electronic device 108 matches a verified machine identification number.

At step 254, the encrypted data retrieval system 102 accesses a device prior history sub-category to determine business rules that define how to determine the category of the request based on the prior history of the source electronic device 108. In some embodiments, a database containing the history of prior requests from the source electronic device 108 as well as prior transmissions of encrypted data to the source electronic device 108 is stored in the storage medium 104. In one of such embodiments, the encrypted data retrieval system 102 categorizes the request based on the number of times the source electronic device 108 has transmitted requests within a time period. Similarly, the encrypted data retrieval system 102 also categorizes the request based on the number of times the encrypted data retrieval system 102 has transmitted the encrypted data to the source electronic device within a given or specified time period.

At step 256, the encrypted data retrieval system 102 accesses the deprecation designation sub-category to determine business rules that define how to determine the category of the request based on whether the source electronic device 108 has been designated as a deprecated system. In some embodiments, the business rules define designating a category that indicates a high-level of risk associated with transmitting the encrypted data to the source electronic device 108 (such as a category request) regardless of the other credentials of the source electronic device 108.

At step 270, the encrypted data retrieval system 102 obtains a fourth category of the business rules that define how to categorize the request based on the user credentials of the authorized user. At steps 272, 274, and 276, respectively, the encrypted data retrieval system 102 accesses the user password, user biometrics, and user assigned key sub-categories to determine business rules that define how to determine the category of the request based on the password assigned to the authorized user, the authorized user's biometrics, and the user's assigned key, respectively. In some embodiments, the business rules define categorizing the request based on the amount of user-based credentials provided by the source electronic device 108. For example, the request would be designated as a category one request if the password assigned to the authorized user, the authorized user's biometrics, and the user's assigned key are all provided to the encrypted data retrieval system 102. Moreover, the request would be designated as a category two request if any of the three user-credentials are missing. Further, the request would be designated as a category three request if no user credentials is provided with the request. At step 278, the encrypted data retrieval system 102 accesses the user history sub-category to determine business rules that define how to determine the category of the request based on the authorized user's prior requests to access the encrypted data. For example, the business rules define assigning the request as a category one request if prior user history indicates that the user has successfully requested access to the encrypted data at least a threshold number of times during a threshold period of time.

At step 290, the encrypted data retrieval system 102 obtains a fifth category of the business rules that define how to categorize the request based on a value of the encrypted data. At step 292, the encrypted data retrieval system 102 accesses an owner specified value sub-category to determine how to determine the category of the request based on the owner specified value of the encrypted data. In that regard, the authorized user may periodically modify the value of the encrypted data. The encrypted data retrieval system 102, in response to receiving an updated value of the encrypted data, determines the category of the request based on the updated value of the encrypted data. At step 294, the encrypted data retrieval system 102 accesses a dynamic adjustments sub-category to determine business rules for dynamically adjusting the value of the encrypted data. In some embodiments, the encrypted data retrieval system 102 is operable to analyze prior requests and future (expected) requests, and to dynamically adjust the value of the encrypted data. For example, the encrypted data retrieval system 102 is operable to dynamically increase the value of the encrypted data if the source electronic device 108 transmits more than a threshold number of requests during an operational duration (e.g., an hour, a day, a week, or another quantifiable period of time). The encrypted data retrieval system 102, in response to dynamically adjusting the value of the encrypted data, determines the category of the request based on the adjusted value of the encrypted data.

Although the foregoing paragraphs describe five categories of business rules for determining the category of the request, the business rules may be organized into a different number of categories. Further, in some embodiments, where multiple business rules that define how to categorize the request are applicable, the encrypted data retrieval system 102 is operable to apply each applicable business rule, and to determine the category of the request based on the aggregate of the applicable business rules. For example, if the encrypted data retrieval system 102 determines the category of the request based on a points system, and where each applicable business rule is assigned a number of points, then the encrypted data retrieval system 102 is operable to aggregate the total number of points and determine the category of the request based on the total number of points.

Figure 3:
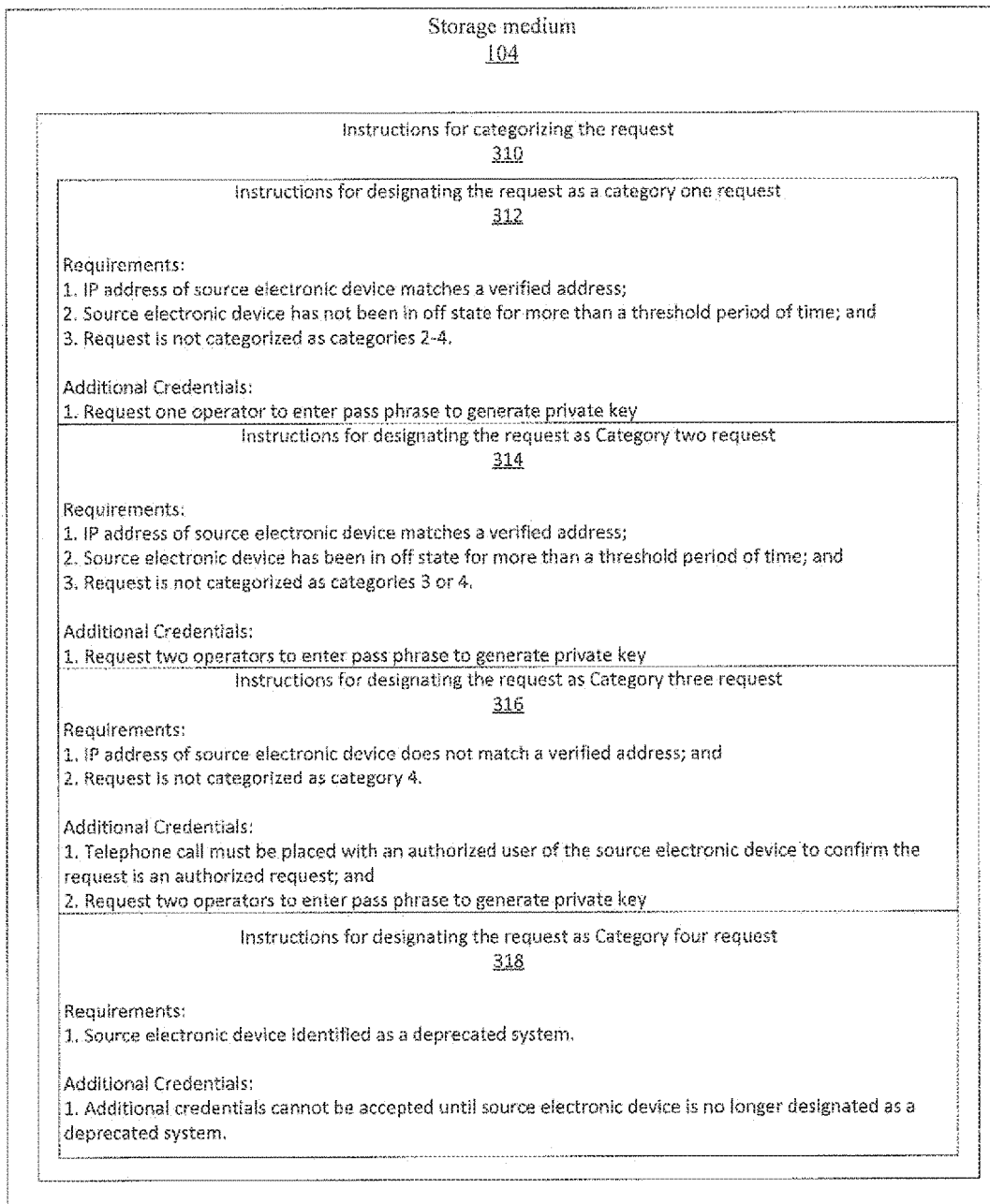
FIG. 3 is a block diagram illustrating the storage medium of FIG. 1 having instructions for selecting one or more additional credentials with which to authenticate the request in accordance with one embodiment.

As stated herein, each category of request is associated with one or more additional credentials, which are used by the encrypted data retrieval system 102 to authenticate the request and to obtain the encrypted data. Moreover, the encrypted data retrieval system 102, upon determining the category of the request, selects one or more additional credentials with which to authenticate the request. FIG. 3 is a block diagram 300 illustrating the storage medium 104 of FIG. 1 having instructions 310 for categorizing the request in accordance with one embodiment. The instructions 310 are further subdivided into four sub-sets of instructions 312, 314, 316, and 318, each sub-set of instructions defining the pre-requisites of the category of request. The instructions 310 also define which additional credentials should be provided to the encrypted data retrieval system 102 to access the encrypted data. Block 312 illustrates a block of instructions specifying prerequisite credentials for categorizing the request as a category one request as well as additional credentials to authenticate the category one request and to obtain the encrypted data. The instructions specify that the request is a category one request if the internet protocol address of the source electronic device 108 matches a verified address, if the source electronic device 108 has not been in an "off state" for more than a threshold period of time, and if the request does not qualify as any other category of request. The instructions further specify that if the request is determined to be a category one request, the encrypted data retrieval system 102 should request the first or the second operator 109 or 111 to provide a passcode assigned to the respective operator to authenticate the request. In such embodiments, the additional credentials are the assigned passcodes of the first and second operators 109 and 111. Moreover, the additional credentials are satisfied when the encrypted data retrieval system receives the passcode of either the first or the second operator 109 or 111.

Block 314 illustrates a block of instructions specifying prerequisite credentials for categorizing the request as a category two request as well as additional credentials to authenticate the category two request and to obtain the encrypted data. The instructions specify that the request is a category two request if the internet protocol address of the source electronic device 108 matches a verified address, if the source electronic device 108 has been in an "off state" for more than a threshold period of time, and if the request does not qualify as a category three request or a category four request. The instructions further specify that if the request is determined to be a category two request, the encrypted data retrieval system 102 should request both the first and the second operators 109 and 111 to provide their assigned passcodes to authenticate the request. In such embodiments, the additional credentials are the assigned passcodes of the first and second operators 109 and 111, and the additional credentials are satisfied when the encrypted data retrieval system 102 receives the assigned passcodes of both the first and the second operators 109 and 111.

Block 316 illustrates a block of instructions specifying prerequisite credentials for categorizing the request as a category three request as well as additional credentials to authenticate the category two request and to obtain the encrypted data. The instructions specify that the request is a category three request if the internet protocol address of the source electronic device 108 does not match any verified address, and if the request does not qualify as a category four request. The instructions further specify that if the request is determined to be a category three request, the encrypted data retrieval system 102 should request at least one of the operators 109 and 111 to place a telephone call with the authorized user of the source electronic device 108 to confirm the authenticity of the request. In such embodiments, the additional credentials are an indication of confirmation of the authenticity of the request and the assigned passcodes of the first and second operators 109 and 111. In such embodiments, the additional credentials are satisfied when the encrypted data retrieval system 102 receives the indication of the confirmation of the authenticity of the request and the assigned passcodes of both the first and the second operators 109 and 111.

Block 318 illustrates a block of instructions specifying prerequisite credentials for categorizing the request as a category four request. The instructions specify that the request is a category four request if the source electronic device is designated as a deprecated system. The instructions further specify that the additional credentials cannot be accepted until the source electronic device 108 is no longer designated as a deprecated system. Although FIG. 3 illustrates four categories of requests, the requests may be designated as one of a different number of categories, each having different pre-requisites, and each being associated with different additional credentials.

Figure 4A:
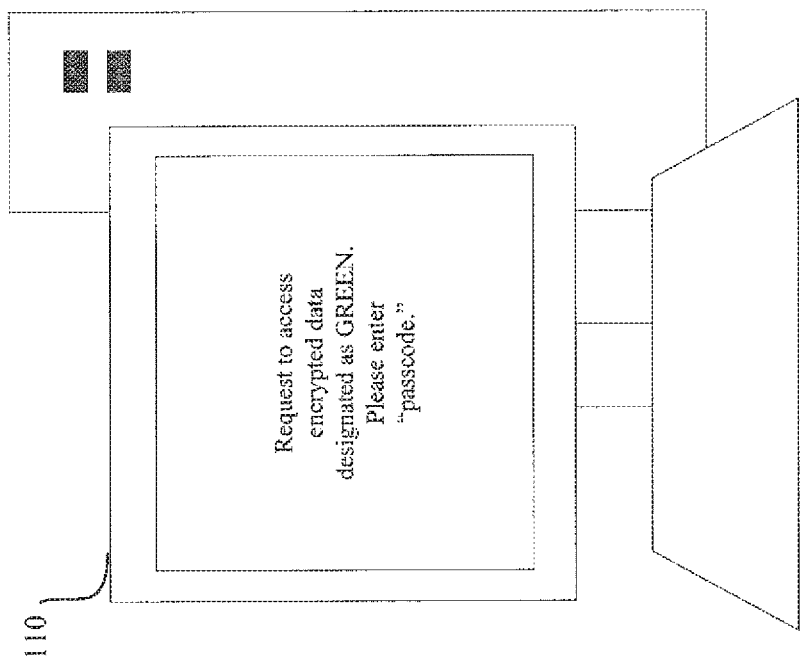
FIG. 4A is a schematic illustration of a display screen of a first electronic device of FIG. 1, where content that identifies the request as a category one request is provided for display on the display screen and in accordance with one embodiment.

In some embodiments, the encrypted data retrieval system 102 provides content indicative of the category of the request as well as which additional credentials should be provided to the encrypted data retrieval system 102 to access the encrypted data to the source electronic device 108. In that regard, FIGS. 4A-4E provide schematic illustrations of the first and second electronic devices 110 and 112, where content indicative of different categories of requests as well as which additional credentials should be provided to the encrypted data retrieval system 102 to access the encrypted data are provided for display on the display screens of the first and second electronic devices 110 and 112. More particularly, FIG. 4A is a schematic illustration of a display screen of a first electronic device 110 of FIG. 1, where the request has been categorized as a category one request and where content that identifies the request as a category one request is provided for display on the display screen of the first electronic device 110. In some embodiments, the encrypted data retrieval system 102 also assigns a color associated with each category of the categories of requests. As shown in FIG. 4A, the category one request is assigned a green color. In one of such embodiments, a green color is displayed in the background section of the display screen of the first electronic device 110. The green background color is not only an indication of the category of the request, but also helps the operator identify the category of the request as well as which additional credentials should be provided to the encrypted data retrieval system 102 to access the encrypted data. In some embodiments, where the encrypted data retrieval system 102 determines a risk level associated with transmitting the encrypted data, the background color is also indicative of the risk level associated with transmitting the encrypted data. For example, a "green" color designates a low-risk level associated with transmitting the encrypted data whereas an "orange" color designates a high-risk level associated with transmitting the encrypted data.

As shown in FIG. 4A, the encrypted data retrieval system 102 also provides text-based instructions on how to satisfy the additional credentials for display on the display screen of the first electronic device 110. In other embodiments, the encrypted data retrieval system 102 is operable to provide other types of content (such as other types of graphical, text-based, audio, visual, multi-media, or similar content) to assist the operator to identify the category of the request, as well as which additional credentials should be provided to the encrypted data retrieval system 102 to access the encrypted data.

Figure 4B:
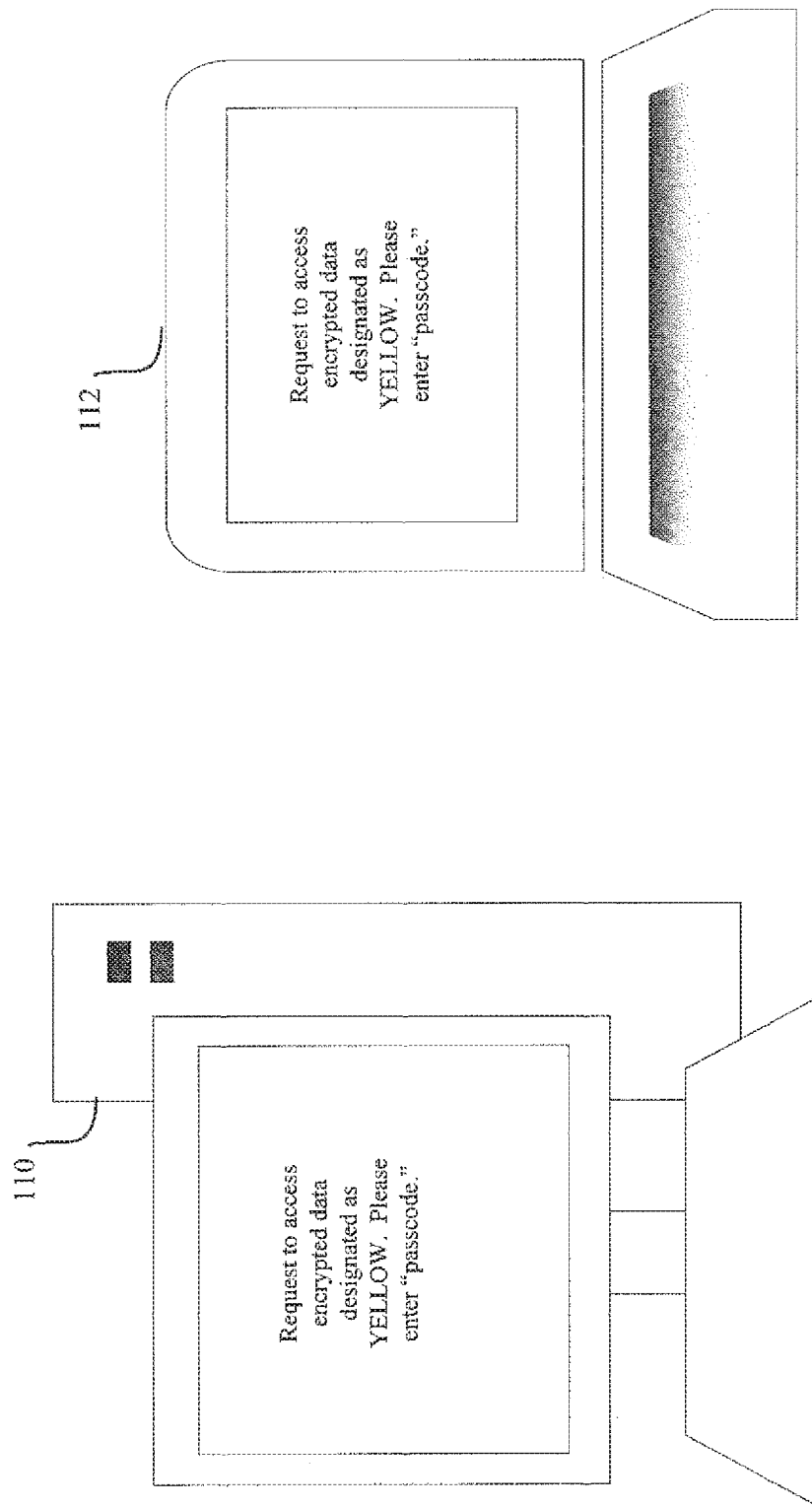
FIG. 4B is a schematic illustration of display screens of the first and second electronic devices of FIG. 1, where content that identifies the request as a category two request is provided for display on the display screens and in accordance with one embodiment.

FIG. 4B is a schematic illustration of display screens of the first and second electronic devices 110 and 112 of FIG. 1, where content that identifies the request as a category two request is provided for display on the display screens. As shown in FIG. 4B, the category two request is assigned a yellow color. In one of such embodiments, a yellow color is displayed in the background section of the display screen of the first electronic device 110. As shown in FIG. 4B, the encrypted data retrieval system 102 also provides text-based instructions on how to satisfy the additional credentials for display on the display screens of the first and second electronic devices 110 and 112. In some embodiments, both operators 109 and 111 should enter their passcodes to satisfy the additional credentials. In other embodiments, where a different number of operators should enter their passcodes to satisfy the additional credentials, the encrypted data retrieval system 102 provides the background color as well as the text-based instructions for display on each operator's electronic device.

Figure 4D:
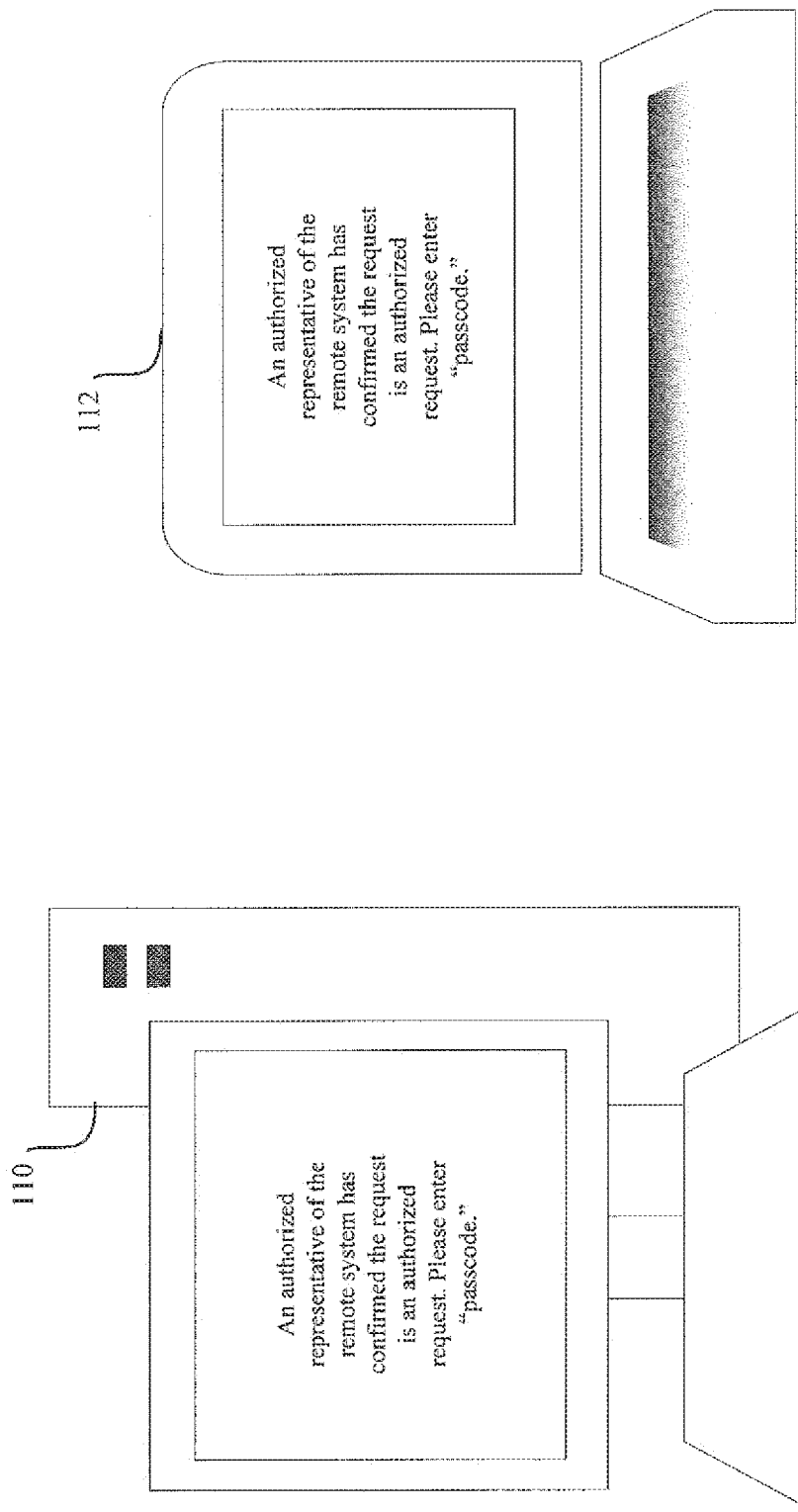
FIG. 4D is a schematic illustration of display screens of the first and second electronic devices of FIG. 1, where content that identifies the request as a category three request is provided for display on the display screens and in accordance with one embodiment.

FIGS. 4C and 4D are schematic illustrations of display screens of the first and second electronic devices 110 and 112 of FIG. 1, where content that identifies the request as a category three request is provided for display on the display screens. As shown in FIG. 4C, the category three request is assigned an orange color. In one of such embodiments, an orange color is displayed in the background section of the display screen of the first electronic device 110. As shown in FIG. 4C, the encrypted data retrieval system 102 also provides text-based instructions requesting the first and second operators 109 and 111 to contact an authorized user of the source electronic device 108 to confirm that the request is an authorized request. As shown in FIG. 4D, once the first or the second operator 109 or 111 verifies that the respective operator has received confirmation of the validity of the request from the authorized user, the encrypted data retrieval system 102 also provides text-based instructions on how to satisfy the remaining additional credentials for display on the display screens of the first and second electronic devices 110 and 112.

Figure 4E:
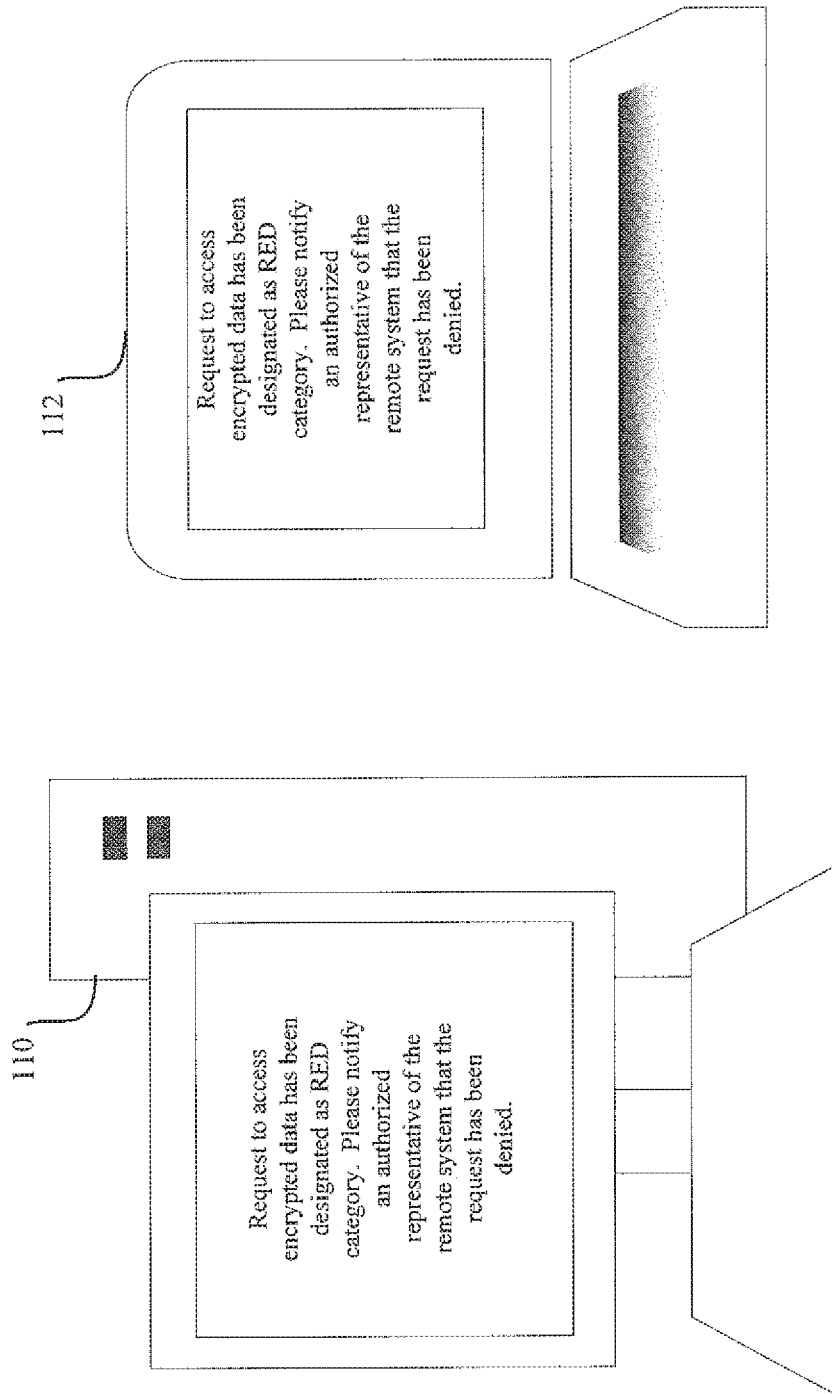
FIG. 4E is a schematic illustration of display screens of the first and second electronic devices of FIG. 1, where content that identifies the request as a category four request is provided for display on the display screens and in accordance with one embodiment.

FIG. 4E is a schematic illustration of display screens of the first and second electronic devices 110 and 112 of FIG. 1, where content that identifies the request as the category four request is provided for display on the display screens. As shown in FIG. 4E, the fourth category is assigned a red color. In one of such embodiments, a red color is displayed in the background section of the display screen of the first and second electronic devices 110 and 112. As shown in FIG. 4E, the encrypted data retrieval system 102 also provides text-based instructions indicating that the encrypted data cannot be provided to the source electronic device. In some embodiments, the encrypted data retrieval system 102 also transmits an indication that the request has been denied to the source electronic device 108. In other embodiments, where the denial may be reversed, the encrypted data retrieval system 102 is also operable to provide content describing how the denial may be reversed. For example, if the source electronic device 108 is identified as a deprecated system due to not having up to date software installed on the source electronic device 108, then the encrypted data retrieval system 102 may provide instructions to the operator instructing the operator to contact the authorized user of the source electronic device 108 to install the up-to-date software.

Figure 5:
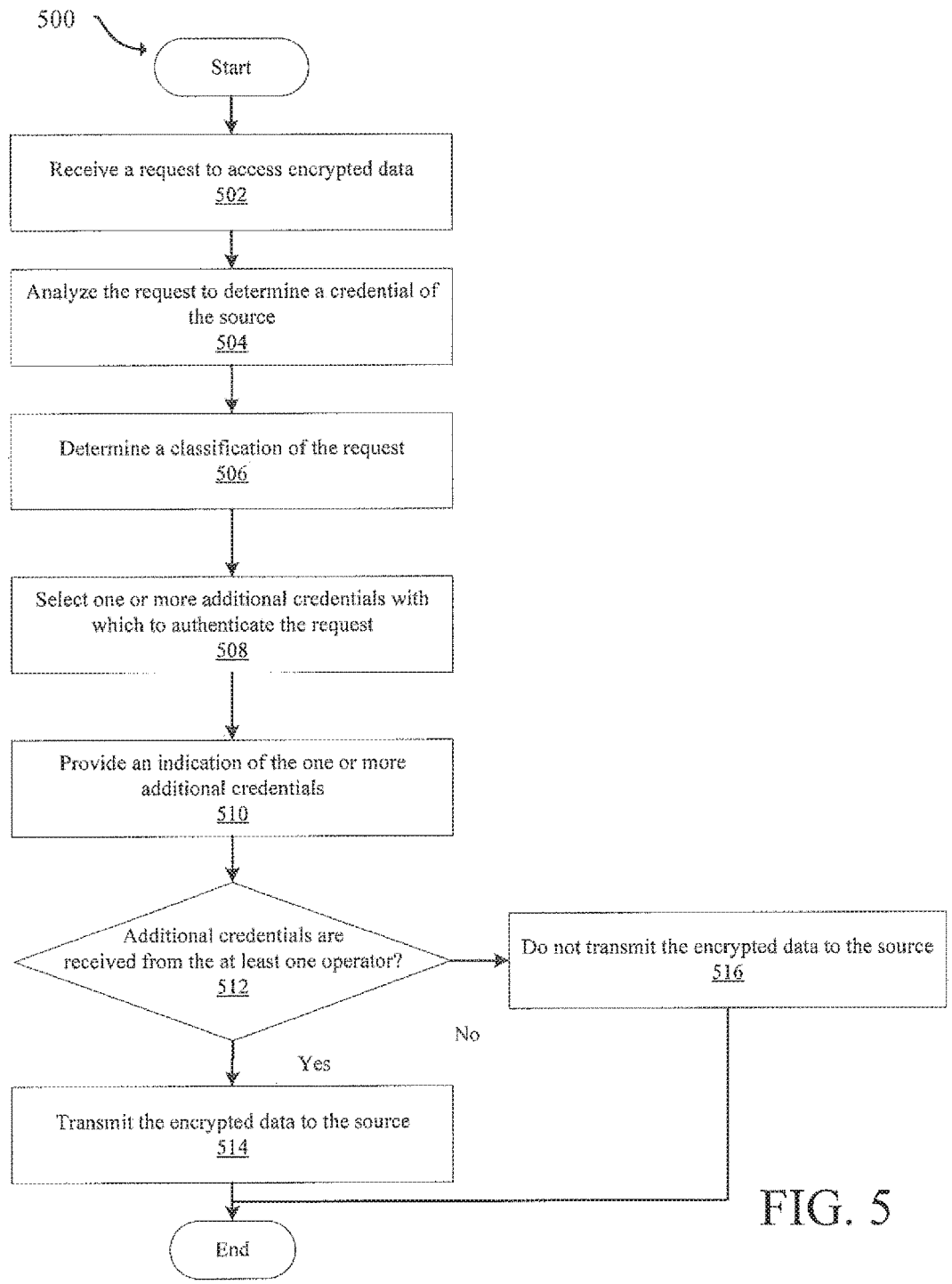
FIG. 5 is a flowchart illustrating a process to access encrypted data in accordance with one embodiment.

FIG. 5 is a flowchart illustrating a process to access encrypted data in accordance with one embodiment. Although the operations in the process 500 are shown in a particular sequence, certain operations may be performed in different sequences or at the same time where feasible.

As described herein, some source electronic devices, such as the source electronic device 108 of FIG. 1, store encrypted data at remote locations, such as the storage medium 104 of FIG. 1, and periodically transmit requests to access the encrypted data. At step 502, the processor of the encrypted data retrieval system 102 receives a request from the source electronic device 108 to access encrypted data. At step 504, the processor analyzes the request to determine the credential of the source electronic device 108. In some embodiments, the processor analyzes the internet protocol address of the source electronic device 108, the network connection type of the source electronic device 108, the geolocation associated with the internet protocol address, the number of hops the request takes, as well as other network-based information related to the request to determine the network-based credentials of the source electronic device 108. In other embodiments, the encrypted data retrieval system 102 analyzes the time elapsed since the last request from the source of the source electronic device 108, the time elapsed since the last transmission of the encrypted data to the source electronic device 108, the offline duration of the source electronic device 108, as well as other request based data to determine the request-based credentials of the source electronic device. In further embodiments, the encrypted data retrieval system 102 analyzes the identification of the source electronic device 108, the prior history of the source electronic device 108, the deprecation designation of the source electronic device 108, as well as other device related data to determine the device-based credentials of the source electronic device 108. In further embodiments, the encrypted data retrieval system 102 analyzes the authorized user's password, the authorized user's biometrics, the authorized user's assigned key, the authorized user's history, as well as other user-based information to determine user-based credentials of the authorized user. Additional types of credentials and operations performed by the encrypted data retrieval system 102 to obtain such credentials are described herein.

At step 506, the processor classifies the request as a category of request based on the credential of the source electronic device 108. In some embodiments, the processor also classifies the category of the request based on the value of the encrypted data. In some embodiments, the processor is further operable to determine, based on the credential of the source electronic device 108 and the value of the encrypted data, the risk level associated with transmitting the encrypted data. In such embodiments, the processor is further operable to associate different thresholds of risk levels with different categories of requests, and to classify the request based on the risk level associated with transmitting the encrypted data to the source electronic device 108.

In some embodiments, the processor determines the credential of the source electronic device 108 based on a points system where different metrics used to determine the credential of the source electronic device are assigned different points. For example, the processor assigns one point for each five-minute interval that the source electronic device 108 is offline for a maximum of four total points. The processor also assigns four points if the internet protocol of the source electronic device 108 does not match a verified internet protocol address. The processor further assigns ten points if the source electronic device 108 is deemed to be a deprecated system. The processor then aggregates the total number of points and determines the category of the request based on the total number of points. Continuing with the foregoing example, the processor classifies the request as a category one request if the aggregate number of points is within a first threshold range (such as one to three points), classifies the request as a category two request if the aggregate number of points is within a second threshold range (such as four to nine points), and classifies the request as a category three request if the aggregate number of points is within a third threshold range (such as ten or more points). The processor, in addition to the foregoing example points system, is also operable to utilize a variety of point systems based on other quantifiable mathematical functions to classify the request based on other metrics described herein as well as other quantifiable metrics for determining the credential of the source electronic device 108. The process 200 provides an additional example of a process for determining the category of the request. Further, FIG. 3 provides an illustration of prerequisite credentials for several example categories of requests.

At step 508, the processor, in response to determining the category of the request, selects one or more additional credentials with which to authenticate the request. In some embodiments, where the categories of request are based on the risk level associated with transmitting the encrypted data to the source electronic device, 108, more stringent or more numerous additional credentials are assigned to categories of requests that are associated with higher risk levels. FIG. 3 provides an illustration of examples of several categories of requests as well as the additional credentials associated with each respective category. In some embodiments, where the categories of the request are based on the value of the encrypted data, the processor selects more stringent or more numerous additional credentials to authenticate requests for "high value" encrypted data. For example, a passcode from one operator would be sufficient to authenticate an encrypted data having a value of less than 10 out of 100, whereas an indication that the authorized user has verified the authenticity of the request together with three different passcodes from three different operators would be sufficient to authenticate an encrypted data having a value of more than 50 out of 100.

At block 510, the processor provides an indication of the one or more additional credentials to at least one operator, such as the first and second operators 109 and 111. In some embodiments, the processor provides additional content indicative of the category to assist the operator to identify the category of request as well as which additional credentials should be provided to the encrypted data retrieval system 102 to access the encrypted data. In one of such embodiments, the processor assigns a different visual indicator (such as color, image, interactive icon) to each category of request, where the assigned visual indicator is displayed in the background of the operator's electronic device. For example, a green color is displayed in the background of the operator's electronic device if the request is classified as a category one request, a yellow color is displayed in the background of the operator's electronic device if the request is classified as a category two request, and a red color is displayed in the background of the operator's electronic device if the request is classified as a category three request. In another one of such embodiments, the processor provides other types of graphical, text-based, audio-visual, or multi-media content for display on the display screen of the operator's electronic device to facilitate the operator to determine the category of the request as well as which additional credentials should be provided to the encrypted data retrieval system 102. FIGS. 4A-4E provide several additional examples of content displayed on the first and second electronic devices 110 and 112.

At block 512, the processor determines whether the additional credentials have been received from a minimum number of operators (e.g., at least two operators, at least three operators, or a different number of operators). In some embodiments, the processor specifies that the additional credentials should be received within a period of time (such as within one minute, two minutes, five minutes, or another quantifiable operational duration). The process proceeds to block 514 if the additional credentials are received by the processor, and the processor transmits the encrypted data to the source electronic device 108. More particularly, the processor, at block 514, operates a transceiver component of the encrypted data retrieval system 102 to transmit the encrypted data to the source electronic device 108. Alternatively, the process proceeds to block 516 if the additional credentials are not received by the processor, or not received by the processor within a designated period of time, and the processor does not transmit the encrypted data to the source electronic device 108. In some embodiments, the processor stores data indicative of the request and the response to the request in the storage medium 104. In one of such embodiments, the processor, in response to receiving a subsequent request to access the encrypted data, is operable to determine based on the data indicative of the current request and the response to the current request, additional credentials to authenticate the subsequent request. As such, the processor is operable to dynamically modify which additional credentials should be provided to authenticate future requests based on the success or failure of prior requests. As described herein, in some embodiments, the encrypted data represents an encrypted key, which the source electronic device 108 utilizes to decrypt another encrypted data, to imitate bootup, or to perform another function.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification.

The above-disclosed embodiments have been presented for purposes of illustration and to enable one of ordinary skill in the art to practice the disclosed embodiments, but are not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to provide data access, the method comprising: receiving a request to access encrypted data; analyzing the request to determine a credential of a source electronic device seeking to access the encrypted data; determining, based on the credential of the source electronic device, a category of the request; in response to determining the category of the request, selecting one or more additional credentials based on the determined category with which to authenticate the request; providing an indication of the one or more additional credentials to at least one operator, wherein the at least one operator is authorized to enter the one or more additional credentials to release the encrypted data and wherein the at least one operator belongs to an entity different from an entity requesting access to the encrypted data; and in response to receiving the one or more additional credentials from the at least one operator, transmitting the encrypted data to the source electronic device.

2. The method of claim 1, wherein analyzing the request further comprises:
   determining an internet protocol address of the source electronic device; and
   obtaining at least one verified internet protocol address of the source electronic device,
   wherein determining the category of the request comprises determining whether the internet protocol address of the source electronic device matches one of the at least one verified internet protocol address of the source electronic device.

3. The method of claim 2, wherein analyzing the request further comprises:
   determining whether a request originating from the internet protocol address of the source electronic device has been previously received; and
   determining an amount of elapsed time between the request and a most recent request that originated from the internet protocol address of the source electronic device,
   wherein determining the category of the request is based on the amount of elapsed time.

4. The method of claim 1, wherein analyzing the request further comprises:
   determining whether the source electronic device has been offline for more than a threshold period of time,
   wherein determining the category of the request is based on whether the source electronic device has been offline for more than the threshold period of time.

5. The method of claim 1, further comprising:
determining, based on the credential of the source electronic device, a risk level associated with transmitting the encrypted data to the source electronic device,
wherein determining the category of the request comprises determining the category of the request based on the risk level associated with transmitting the encrypted data to the source electronic device.

6. The method of claim 1, further comprising:
determining one or more metrics used to determine the credential of the source electric device, wherein each metric is assigned a respective value; and
aggregating the respective value of each metric of the one or more metrics to calculate an aggregate value,
wherein determining the category of the request comprises determining the category of the request based on the aggregate value.

7. The method of claim 1, further comprising:
assigning a visual indicator to the category of the request,
wherein providing the indication of the one or more additional credentials comprises providing the visual indicator for display on an electronic device of the operator.

8. The method of claim 7, wherein assigning the visual indicator to the category comprises assigning a first color to the category if an internet protocol address of the source electronic device matches one of at least one verified internet protocol address of the source electronic device.

9. The method of claim 8, further comprising:
determining a minimum number of the at least one operator to enter the one or more additional credentials to release the encrypted data; and
receiving an input from each of the minimum number of the at least one operator,
wherein transmitting the encrypted data to the source electronic device comprises transmitting the encrypted data to the source electronic device in response to receiving the one or more additional credentials from each of the minimum number of the at least one operator.

10. The method of claim 7, wherein assigning the visual indicator to the category comprises assigning a second color to the category if an internet protocol address of the source electronic device does not match any of at least one verified internet protocol address of the source electronic device.

11. The method of claim 7, further comprising:
determining an amount of elapsed time since the source electronic device has been offline,
wherein analyzing the request further comprises determining whether the source electronic device has been offline for more than a threshold period of time, and
wherein assigning the visual indicator to the category comprises assigning a third color to the category if the source electronic device has been offline for more than the threshold period of time.

12. The method of claim 11, further comprising:
transmitting a request to the at least one operator to contact an authorized user of the source electronic device to obtain confirmation of a validity of the request;
receiving an indication from the at least one operator that the validity of the request has been confirmed by the authorized user, the indication being one of the one or more credentials; and
in response to receiving the indication and each of the one or more additional credentials from the at least one operator, transmitting the encrypted data to the source electronic device.

13. The method of claim 7, further comprising:
identifying at least one deprecated system, wherein each deprecated system of the at least one deprecated system represents a system no longer in use,
wherein analyzing the request further comprises determining whether an identification of the source electronic device matches any one of the at least one deprecated system, and
wherein assigning the visual indicator to the category comprises assigning a fourth color to the category if the identification of the source electronic device matches any one of the at least one deprecated system.

14. The method of claim 13, further comprising transmitting an indication denying the request to access the encrypted data to the source electronic device.

15. The method of claim 1, further comprising:
determining a value of the encrypted data,
wherein determining the category of the request comprises determining the category of the request based on the value of the encrypted data.

16. The method of claim 15, further comprising:
determining, based on the value of the encrypted data, a minimum number of operators of the at least one operator to enter the one or more additional credentials,
wherein providing the indication of the one or more additional credentials to the at least one operator comprises providing the indication of the one or more additional credentials to the minimum number of operators, and
wherein transmitting the encrypted data to the source electronic device comprises transmitting the encrypted data to the source electronic device in response to receiving the one or more additional credentials from each of the minimum number of operators.

17. The method of claim 1, further comprising:
storing data indicative of the request and a response to the request in a storage medium; and
in response to receiving a subsequent request to access the encrypted data, determining, based on the data indicative of the request and the response to the request, one or more additional credentials to access the encrypted data.

18. The method of claim 1, wherein, in response to receiving the one or more additional credentials from the at least one operator, the method further comprises reconstructing an encrypted key based on the one or more additional credentials, wherein the encrypted key is the encrypted data.

19. An encrypted data retrieval system, comprising: a storage medium operable to store: encrypted data; and a plurality of additional credentials to access the encrypted data; and a processor operable to: analyze, a request from a source electronic device to access encrypted data, to determine a credential of the source electronic device to access the encrypted data; determine, based on the credential of the source electronic device, a category of the request; in response to a determination of the category of the request, select one or more additional credentials based on the determined category with which to authenticate the request; assign a visual indicator to the one or more additional credentials; provide an indication of the one or more credentials to an operator, wherein the indication comprises the visual indicator, and wherein the operator is authorized to enter the one or more additional credentials to release the encrypted data and wherein the at least one operator belongs to an entity different from an entity requesting access to the encrypted data; and in response to receipt of the one or more additional credentials from the operator within an operational duration, operate a transceiver to transmit the encrypted data to the source electronic device.

20. The encrypted data retrieval system of claim 19, wherein the processor is further operable to:
   obtain an internet protocol address of the source electronic device;
   determine whether the internet protocol address of the source electronic device matches one of at least one verified interact protocol address of the source electronic device; and
   assign a first color to the category in response to determining that the internet protocol address of the source electronic device matches one of the at least one verified internet protocol address of the source electronic device, the first color being the visual indicator.

21. The encrypted data retrieval system of claim 19, wherein the processor is further operable to:
   determine an amount of elapsed time since the source electronic device has been offline; and
   assign a second color to the category in response to determining that the source electronic device has been of for more than a threshold period of time, the second color being the visual indicator.

22. The encrypted data retrieval system of claim 19, wherein the processor is further operable to:
   identify one or more deprecated systems, wherein each deprecated system of the one or more deprecated systems represents a system no longer in use;
   determine whether an identification of the source electronic device matches any of the one or more deprecated systems; and
   assign a third color to the category in response to determining that the identification of the source electronic device matches any of the one or more deprecated systems, the third color being the visual indicator.

23. A non-transitory machine-readable medium comprising instructions stored therein, which when executed by one or more processors, causes the one or more processors to perform operations comprising: receiving a request from a source electronic device to access encrypted data; analyzing the request to determine an internet protocol address of the source electronic device and credential of the source electronic device to access the encrypted data; determining, based on the internet protocol address and the credential of the source electronic device, a category of the request; in response to determining the category of the request, selecting one or more additional credentials based on the determined category with which to authenticate the request; providing an indication of the one or more additional credentials to an operator, wherein the operator is authorized to enter the one or more additional credentials to release the encrypted data and wherein the at least one operator belongs to an entity different from an entity requesting access to the encrypted data; in response to receiving the one or more additional credentials from the operator within an operational duration, transmitting the encrypted data to the source electronic device; storing data indicative of the request and a response to the request in a storage medium; and in response to receiving a subsequent request to access the encrypted data, determining, based on the data indicative of the request and the response to the request, additional credentials to access the encrypted data.

* * * * *